(12) United States Patent
Takezawa et al.

(10) Patent No.: US 7,803,485 B2
(45) Date of Patent: Sep. 28, 2010

(54) POSITIVE ELECTRODE FOR LITHIUM SECONDARY BATTERY, AND LITHIUM SECONDARY BATTERY USING THE SAME

(75) Inventors: Hideharu Takezawa, Nara (JP); Hajime Nishino, Nara (JP)

(73) Assignee: Panasonic Corporation, Osaka (JP)

( * ) Notice: Subject to any disclaimer, the term of this patent is extended or adjusted under 35 U.S.C. 154(b) by 752 days.

(21) Appl. No.: 11/485,999

(22) Filed: Jul. 14, 2006

(65) Prior Publication Data

US 2007/0015058 A1  Jan. 18, 2007

(30) Foreign Application Priority Data

Jul. 14, 2005 (JP) ............................. 2005-205266

(51) Int. Cl.
  *H01M 4/58* (2010.01)
  *H01M 4/50* (2010.01)
  *H01M 4/52* (2010.01)
(52) U.S. Cl. .................... 429/231.95; 429/223; 429/224
(58) Field of Classification Search ............. 429/231.95
  See application file for complete search history.

(56) References Cited

U.S. PATENT DOCUMENTS 6,333,128 B1 * 12/2001 Sunagawa et al. ...... 429/231.95

FOREIGN PATENT DOCUMENTS

JP 2001-338639 * 12/2001
JP 2003036838 2/2003

OTHER PUBLICATIONS

Machine Translation of JP 2001-338639 provided with previous rejection.*
Chinese Office Action, with English translation, issued in Chinese Patent Application No. CN 2006101056902, mailed Jan. 9, 2009.

* cited by examiner

*Primary Examiner*—Patrick Ryan
*Assistant Examiner*—Ashley Kwon
(74) *Attorney, Agent, or Firm*—McDermott Will & Emery LLP

(57) ABSTRACT

A positive electrode for use in a lithium secondary battery comprises a positive electrode current collector, and a positive electrode film which is carried on the positive electrode current collector and includes a plurality of mixture layers. The positive electrode film contains, as a positive electrode active material, two or more kinds of lithium-containing compounds having exothermic initiation temperatures different from each other. At least one kind of the two or more kinds of lithium-containing compounds has the exothermic initiation temperature of 300 ° C. or higher. A first mixture layer of the plural mixture layers closest to the positive electrode current collector contains at least one kind of the lithium-containing compound having the exothermic initiation temperature of 300 ° C. or higher.

18 Claims, 1 Drawing Sheet

POSITIVE ELECTRODE FOR LITHIUM SECONDARY BATTERY, AND LITHIUM SECONDARY BATTERY USING THE SAME

BACKGROUND OF THE INVENTION

1. Field of the Invention

The present invention relates to a positive electrode, for use in a lithium secondary battery, having a large capacity and enhanced reliability in a nail penetration test, and to the lithium secondary battery using the positive electrode.

2. Description of the Related Art

Lithium secondary batteries are used as power sources for driving laptop personal computers, portable communication devices, and the like. In recent years, development of portable or wireless electronic devices has increased a demand for large-capacity, compact, and lightweight electronic devices. In response to the demand, large-capacity lithium secondary batteries have been developed thanks to the improvement or modification of electrode materials, improvement of battery construction, and the like. The expansion of a battery capacity leads to an increase of an energy density of the battery, which increases a demand for enhanced reliability of the battery upon releasing a large energy in an internal short-circuit test or the like. In view of this, there is a strong demand for lithium secondary batteries that meet the requirements for high reliability in the internal short-circuit test concurrently with those for large capacity.

There is known an internal short-circuit test to penetrate a nail into the battery (hereinafter, called as "nail penetration test"), as one of the tests to check reliability of lithium secondary batteries at the internal short-circuiting. Once a positive electrode initiates its thermal decomposition by the internal short-circuiting in a nail penetration test, the lithium secondary battery with a large energy density releases a large energy, which may overheat the battery by thermal runaway. The overheating of the lithium secondary battery in the nail penetration test is greatly influenced by thermostability of the positive electrode.

Thermostability of the positive electrode depends on thermostability of an active material used for the positive electrode. Known examples of the active materials used for the positive electrode in the lithium secondary battery are lithium-containing composite oxides such as $LiCoO_2$ or $LiNiO_2$ having a layered structure, and $LiMn_2O_4$ having a spinel structure. These lithium-containing composite oxides are different from each other in electrochemical properties and thermostabilities.

For instance, a lithium nickel oxide such as $LiNiO_2$ has a reversible capacity of 180 to 200 mAh/g, and has a larger capacity density, a lower exothermic initiation temperature and a lower thermostability than the other lithium-containing oxides. Therefore, lithium secondary batteries using the lithium nickel oxide as the positive electrode active material tend to be overheated in a nail penetration test.

In view of the above, there are proposed lithium secondary batteries using, as the positive electrode active material, a lithium-containing composite oxide obtained by partially substituting the nickel component of $LiNiO_2$ with other element, and lithium secondary batteries using, as the positive electrode active material, a mixture of a lithium nickel oxide and a lithium-containing composite oxide having a higher thermostability than the lithium nickel oxide to suppress oxygen release at the thermal decomposition so as to improve thermostability of the positive electrode while maintaining the large capacity of the positive electrode.

For instance, Japanese Unexamined Patent Publication No. 2003-36838 discloses a lithium secondary battery with a positive electrode constructed as follows. The positive electrode has two or more mixture layers, on a surface of a positive electrode current collector, containing a lithium-containing composite oxide as a positive electrode active material, wherein a positive electrode active material having a higher exothermic initiation temperature is used for the outermost mixture layer. According to the conventional art, in conducting a nail penetration test, instantaneously when a nail, which assumes a negative electrode potential by penetrating through the negative electrode, contacts the positive electrode, a large current flows through the outermost surface of the positive electrode, which generates Joule heat. The above construction has been proposed to prevent thermal decomposition of the positive electrode by the Joule heat.

The nail penetration test is conducted to check whether a battery has overheated by intentionally generating an internal short-circuit, which may occur by intrusion of foreign matters or the like. In view of this, it is desirable to conduct a nail penetration test under an internal short-circuit condition corresponding to an assumed most severe use environment. For instance, in the case where a nail penetration speed is slow in the nail penetration test, an internal short-circuiting occurs with higher probability than a case where the nail penetration speed is fast. As a result, a current is collected at a short-circuited portion, which may overheat the battery. A lithium secondary battery with a large capacity has a strong demand for suppressing overheating in the nail penetration test under the above-mentioned severe internal short-circuit condition.

According to the detailed research and development on the lithium secondary batteries by the inventors, however, it could not be confirmed that overheating of the lithium secondary battery disclosed in the above publication was remarkably suppressed in the nail penetration test under the aforementioned severe internal short-circuit condition.

SUMMARY OF THE INVENTION

In view of the above problems residing in the prior art, it is an object of the present invention to provide a positive electrode for a lithium secondary battery that enables to securely suppress overheating of a lithium secondary battery in a nail penetration test under an internal short-circuit condition corresponding to an assumed severe use environment, and to provide a lithium secondary battery which has a large capacity and enhanced reliability, with use of such positive electrode.

An aspect of the invention which has accomplished the above object is directed to a positive electrode, for use in a lithium secondary battery, comprising a positive electrode current collector, and a positive electrode film which is carried on the positive electrode current collector and includes a plurality of mixture layers, wherein the positive electrode film contains, as a positive electrode active material, two or more kinds of lithium-containing compounds having exothermic initiation temperatures different from each other, at least one kind of the two or more kinds of lithium-containing compounds has the exothermic initiation temperature of 300° C. or higher, and a first mixture layer of the plural mixture layers, closest to the positive electrode current collector, contains at least one kind of the lithium-containing compound having the exothermic initiation temperature of 300° C. or higher.

These and other objects, features and advantages of the present invention will become more apparent upon reading of the following detailed description along with the accompanying drawings.

DETAILED DESCRIPTION OF THE PREFERRED EMBODIMENTS

Figure 1:
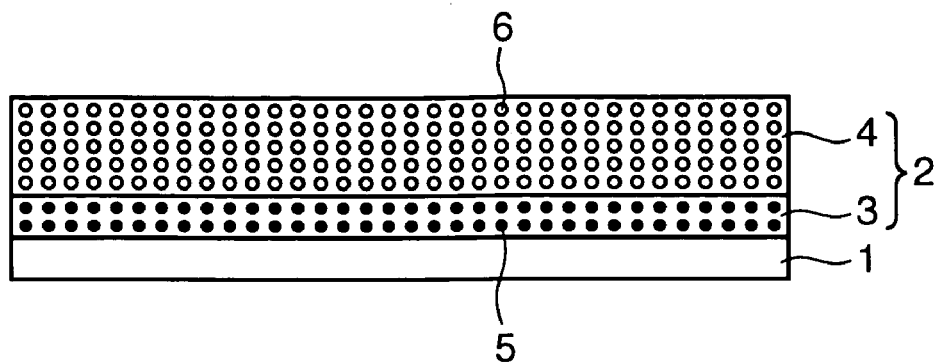
FIG. 1 is a schematic cross-sectional view showing an example of a positive electrode for use in a lithium secondary battery in accordance with a first embodiment of the invention.

According to the investigation by the inventors about the exothermic mechanism by internal short-circuiting in a nail penetration test at a low penetration speed of e.g. about 5 mm/sec., it has been clarified that a site where a largest heat energy is released by the internal short-circuiting is not the outermost mixture layer which contacts first the nail that assumes a negative electrode potential by penetrating through the negative electrode, but the positive electrode current collector, or a boundary between the positive electrode current collector and the positive electrode film.

Specifically, the internal short-circuiting generates Joule heat primarily by electric conduction between a positive electrode current collector and a negative electrode current collector, and the Joule heat overheats the lithium secondary battery. The calorie in terms of Joule heat is proportional to square of a current at an internal short-circuit (hereinafter, called as "short-circuit current") according to Joule's law. Based on the above relation, a reduction in a resistance at an internal short-circuited portion (hereinafter, called as "short-circuit resistance") may likely to cause a short-circuit current to flow, which increases the Joule heat. Here, the specific resistance of an aluminum foil generally used as the positive electrode current collector is $2.75 \times 10^{-6}$ Ω·cm, which is significantly smaller than the specific resistance (=about 10 to $10^4$ Ω·cm) of a generally used mixture layer of the positive electrode.

In view of the above, it is considered that a large short-circuit current flows, thereby generating larger Joule heat, when the nail contacts the aluminum foil i.e. the positive electrode current collector, as compared with a case that the nail contacts the outermost mixture layer of the positive electrode having a larger specific resistance.

The aspect of the invention has been made based on the above finding.

More specifically, the feature that the positive electrode film comprises the plural mixture layers and the first mixture layer closest to the positive electrode current collector which generates large Joule heat by internal short-circuiting in the nail penetration test contains at least one kind of the lithium-containing compound having the exothermic initiation temperature of 300° C. or higher enables to securely suppress an exothermic action of the positive electrode by the internal short-circuiting to thereby minimize thermal runaway of the positive electrode. Further, the positive electrode film contains the lithium-containing compound other than the lithium-containing compound having the exothermic initiation temperature of 300° C. or higher, in other words, the lithium-containing compound having a significantly large capacity density with a low exothermic initiation temperature, which enables to make the positive electrode capacity large as a whole. Consequently, these provide a positive electrode for use in a lithium secondary battery capable of securely suppressing overheating of the battery in the nail penetration test, and having a large capacity.

In the following, preferred embodiments of the invention will be described in details referring to the drawings.

First Embodiment

A positive electrode according to a first embodiment of the invention, for use in a lithium secondary battery, comprises a positive electrode current collector, and a positive electrode film which is carried on the positive electrode current collector and includes plural mixture layers. The positive electrode film contains, as a positive electrode active material, two or more kinds of lithium-containing compounds having exothermic initiation temperatures different from each other. At least one kind of the two or more kinds of lithium-containing compounds has the exothermic initiation temperature of 300° C. or higher, and a first mixture layer of the plural mixture layers, which is closest to the positive electrode current collector, contains at least one kind of lithium-containing compound having the exothermic initiation temperature of 300° C. or higher.

The positive electrode according to the first embodiment is described referring to FIG. 1.

FIG. 1 is a schematic cross-sectional view showing an example of the positive electrode according to the first embodiment.

The positive electrode in FIG. 1 has a positive electrode current collector 1, and a positive electrode film 2 formed on the positive electrode current collector 1. The positive electrode film 2 has two layers consisting of a first mixture layer 3 closest to the positive electrode current collector 1, and an outer mixture layer 4 formed on the outer side of the positive electrode film 2. FIG. 1 shows a case that the outer mixture layer 4 is made of a single layer. Alternatively, the outer mixture layer 4 may be made of two or more layers. The positive electrode film 2 made of the two mixture layers contains, as a positive electrode active material, two kinds of lithium-containing compounds 5 and 6 having exothermic initiation temperatures different from each other. One of the two kinds of the lithium-containing compounds (in this embodiment, the lithium-containing compound 5) has the exothermic initiation temperature of 300° C. or higher. The first mixture layer 3 closest to the positive electrode current collector 1 contains the lithium-containing compound 5 having the exothermic initiation temperature of 300° C. or higher. The outer mixture layer 4 contains the lithium-containing compound 6 other than the lithium-containing compound 5, in other words, a lithium-containing compound whose exothermic initiation temperature is lower than that of the lithium-containing compound 5 and whose capacity density is significantly large. Alternatively, the first mixture layer 3 may contain the lithium-containing compound 6 in addition to the lithium-containing compound 5. Further alternatively, the outer mixture layer 4 may contain the lithium-containing compound 5 in addition to the lithium-containing compound 6.

In the thus-constructed positive electrode, even if a nail that assumes a negative electrode potential by penetrating through the negative electrode in a nail penetration test has contacted the positive electrode current collector 1, and high Joule heat has been resultantly generated by internal short-circuiting, thermal runaway of the positive electrode can be prevented because the lithium-containing compound 5 contained in the first mixture layer 3 closest to the positive electrode current collector 1 has the exothermic initiation temperature of 300° C. or higher. Thereby, further overheat of the battery can be prevented. As mentioned above, the outer mixture layer 4 contains the lithium-containing compound 6 having the exothermic initiation temperature lower than that of the lithium-containing compound 5 contained in the first mixture layer 3. However, the first mixture layer 3 having a high specific resistance keeps the outer mixture layer 4 away from direct contact with the positive electrode current collector 1. Accordingly, there is no or less likelihood that the positive electrode may cause thermal runaway. Also, the significantly large capacity density of the lithium-containing compound 6 contained in the outer mixture layer 4 enables to make the positive electrode capacity large.

In the embodiment of the invention, at least one kind of the lithium-containing compound contained in the first mixture layer 3 closest to the positive electrode current collector 1 has an exothermic initiation temperature of 300° C. or higher. Lithium-containing compounds usable as the positive electrode active material can be roughly classified into two groups, in terms of an exothermic initiation temperature, between which the temperature zone ranging from about 250 to 300° C. is sandwiched. One group is lithium-containing compounds having a higher exothermic initiation temperature i.e. 300° C. or higher, and the other group is lithium-containing compounds having a lower exothermic initiation temperature i.e. 250° C. or lower. The investigation by the inventors has shown that the first mixture layer 3 containing the lithium-containing compound having the exothermic initiation temperature of 300° C. or higher enables to suppress an exothermic action of the first mixture layer 3, even if high Joule heat generates at the positive electrode current collector 1 and a boundary between the positive electrode current collector 1 and the first mixture layer 3 in a nail penetration test at a low penetration speed, which enables to prevent overheating of the battery.

The exothermic initiation temperature of the lithium-containing compound in the embodiment of the invention can be measured according to the following method, for instance. In case of a lithium-containing compound prepared by a predetermined process, a sheet-like electrode in which a conductive agent and a binder are added to the lithium-containing compound is prepared. After the measurement cell provided with the sheet-like electrode as an operation electrode is charged up to a predetermined voltage, the positive electrode active material is sampled, and the exothermic initial temperature is measured by a differential scanning calorimeter (DSC). In case of a lithium-containing compound in a prepared lithium secondary battery, the battery is charged up to a predetermined voltage. After the battery is disassembled to recover the positive electrode active material, the exothermic initiation temperature of the positive electrode active material is measured by the differential scanning calorimeter (DSC). As a measurement condition, the positive electrode active material as a specimen is heated with a temperature rising rate of 10° C. per minute, and an onset temperature from the baseline in a profile obtained by the DSC is defined as the exothermic initiation temperature. Generally, a lithium-containing compound whose exothermic initiation temperature is high and whose crystalline structure in a high-temperature condition is stable is less likely to cause thermal decomposition of the positive electrode active material. Therefore, the exothermic initiation temperature is a primary index for evaluating thermostability of the positive electrode active material.

In the embodiment of the invention, the lithium-containing compound 5 which is contained in the first mixture layer 3 closest to the positive electrode current collector 1 and whose exothermic initiation temperature is 300° C. or higher may be of one or more kinds. If one kind of the lithium-containing compound having the exothermic initiation temperature of 300° C. or higher is used, it is preferred to use a lithium-containing compound having a higher exothermic initiation temperature e.g. 400° C. or higher. If two or more kinds of the lithium-containing compounds are used, it is preferred to increase the content of the lithium-containing compound having a higher exothermic initiation temperature e.g. 400° C. or higher relative to the total contents of the lithium-containing compound having the exothermic initiation temperature of 300° C. or higher in the aspect of securely suppressing an exothermic action of the positive electrode by internal short-circuiting.

The first mixture layer 3 may contain, as the positive electrode active material, the lithium-containing compound 6 having the lower exothermic initiation temperature in addition to the lithium-containing compound 5 having the exothermic initiation temperature of 300° C. or higher. In this case, it is preferred to set the content of the lithium-containing compound 5 having the exothermic initiation temperature of 300° C. or higher larger than the content of the lithium-containing compound 6 having the lower exothermic initiation temperature in the aspect of suppressing an exothermic action of the positive electrode by internal short-circuiting. Also, the first mixture layer 3 may contain preferably 80% or more by mass, more preferably 90% or more by mass, and most preferably 100% by mass of the lithium-containing compound 5 having the exothermic initiation temperature of 300° C. or higher relative to a total amount of the lithium-containing compounds in the first mixture layer 3.

In the embodiment of the invention, the outer mixture layer 4, which is made of one or more layers, contains the lithium-containing compound 6 other than the lithium-containing compound 5 having the exothermic initiation temperature of 300° C. or higher, e.g., a lithium-containing compound with an exothermic initiation temperature lower than 300° C. and yet a significantly large capacity density. The lithium-containing compound 6 contained in the outer mixture layer 4 may be of one or more kinds. If the outer mixture layer 4 is made of a single layer, the outer mixture layer 4 may contain one or more kinds of the lithium-containing compound 6. If the outer mixture layer 4 is made of two or more layers, one or more kinds of the lithium-containing compound 6 whose exothermic initiation temperatures are different from each other may be contained in the respective layers.

The outer mixture layer 4 may additionally contain the lithium-containing compound 5 having the exothermic initiation temperature of 300° C. or higher. In this case, preferably, the content of the lithium-containing compound 6 whose exothermic initiation temperature is lower than 300° C. and whose capacity density is significantly large may be larger than the content of the lithium-containing compound 5 having the exothermic initiation temperature of 300° C. or higher. The content of the lithium-containing compound 6 may preferably be 80% or more by mass, and more preferably be 90% or more by mass.

In the embodiment of the invention, the outermost layer of the positive electrode film made of the plural mixture layers may essentially consist of the lithium-containing compound 5 having the exothermic initiation temperature of 300° C. or higher. In a nail penetration test at a high penetration speed, even if a large current flows on the outermost surface of the positive electrode instantaneously when a nail that has penetrated through a negative electrode contacts the positive electrode, and Joule heat resultantly generates, thermal decomposition of the positive electrode by the Joule heat can be prevented.

In the embodiment of the invention, the inclusion of the lithium-containing compound 5 having the exothermic initiation temperature of 300° C. or higher in the first mixture layer 3 enables to effectively suppress generation of high Joule heat resulting from internal short-circuiting in a nail penetration test. This allows for reduction of the thickness of the first mixture layer 3 to be formed on the positive electrode current collector 1. Also, the reduced thickness of the first mixture layer 3 enables to relatively increase the thickness of the outer mixture layer 4 made of one or more layers, which allows for inclusion of the lithium-containing compound 6 having a significantly large capacity density with a high concentration.

The average thickness of the first mixture layer 3 on one side of the positive electrode current collector 1 can be reduced to the range of 0.5 to 20 μm, and may be preferably in the range of 2 to 15 μm, and more preferably in the range of 5 to 10 μm. The ratio of the average thickness of the first mixture layer 3 to the average thickness of the outer mixture layer 4 made of one or more layers is preferably in the range of 0.5:100 to 20:100, and more preferably in the range of 5:100 to 18:100.

In the embodiment of the invention, preferred examples of the lithium-containing compound having the exothermic initiation temperature of 300° C. or higher is one kind selected from the group consisting of lithium-manganese-based oxides, lithium-nickel-cobalt-manganese-based oxides, and olivine-type lithium-phosphate-based compounds. These lithium-containing compounds are preferred in the point that their crystalline structures are less likely to cause thermal decomposition, as well as their high exothermic initiation temperatures.

In the embodiment of the invention, all the above preferred examples of the lithium-containing compounds having the exothermic initiation temperature of 300° C. or higher show substantial effects in suppressing voltage lowering of the battery resulting from short-circuiting in the nail penetration test at a low penetration speed. The results clarify that the positive electrodes using the lithium-containing compounds enable to securely suppress overheating of the battery in the nail penetration test.

In the case where internal short-circuiting has occurred by a nail penetration test at a low penetration speed, the battery voltage may be lowered resulting from generation of Joule heat. However, the aforementioned examples of the lithium-containing compounds having the exothermic initiation temperature of 300° C. or higher not only have a property of suppressing the voltage lowering but also have a property of recovering the battery voltage to a voltage higher than a lowest voltage in a short-circuit state. This allows for charging and discharging control with use of a potential difference between a lowest voltage in a short-circuit state and a voltage in a recovery state.

It is preferred to use a lithium manganese oxide of a spinel structure represented by $LiMn_2O_4$, as the lithium-manganese-based oxide. The lithium manganese oxide has a high thermal decomposition temperature, and high thermostability due to less oxygen release at the time of thermal decomposition, in addition to its high exothermic initiation temperature e.g. 320° C., which is measured by the aforementioned measurement method. A lithium-manganese-based oxide obtained by partly substituting the manganese component of the lithium-manganese-based oxide by other element such as Cr, Fe, Mg, or Al, may be used to improve cycle characteristics of the lithium-manganese-based oxide.

Lithium-nickel-manganese-cobalt-based oxides are compounds in which nickel and cobalt are contained in the composition of the lithium-manganese-based oxides. A preferred example of the lithium-nickel-manganese-cobalt-based oxides is a lithium nickel manganese cobalt oxide represented by the chemical formula: $Li_aNi_{1-(b+c)}Mn_bCo_cO_2$ where a, b, and c respectively satisfies $1 \leq a \leq 1.2$, $0.1 \leq b \leq 0.5$, and $0.1 \leq c \leq 0.5$. The lithium nickel manganese cobalt oxide having the above composition not only has stability but also is less costly. The value "a" may preferably satisfy the requirement: $1 \leq a \leq 1.2$. The value "a" of 1 or larger enables to securely suppress the existence of electrochemically inactive impurities such as nickel oxide or cobalt oxide, which suppresses lowering of the capacity because lithium salt as a raw material sufficiently exists. The value "a" of 1.2 or smaller enables to securely suppress lithium compound residues as impurities, which also suppresses lowering of the capacity because there is less likelihood that lithium salt as a raw material may excessively exist. The value "a" is defined in an uncharged state of the battery. The value "b" may preferably satisfy the requirement: $0.1 \leq b \leq 0.5$ in light of the points that the value "b" of 0.1 or larger enables to securely obtain improved thermostability, and that the value "b" of 0.5 or smaller is less likely to cause capacity lowering. Also, the value "c" may preferably satisfy the requirement: $0.1 \leq c \leq 0.5$ in light of the points that the value "c" of 0.1 or larger provides a more stabilized crystalline structure, which causes no or less cycle characteristics deterioration, and that the value "c" of 0.5 or smaller is less likely to cause capacity lowering. For instance, the exothermic initiation temperature of a lithium nickel manganese cobalt oxide represented by $LiNi_{1/3}Mn_{1/3}Co_{1/3}O_2$ is 305° C. according to the above measurement method.

A preferred example of the olivine-type lithium-phosphate-based compounds is an olivine-type lithium phosphate compound represented by $LiMePO_4$ where Me is at least one element selected from the group consisting of Co, Ni, Fe, and Mn. The olivine-type lithium phosphate compound not only has a crystalline structure with less likelihood of thermal decomposition, but also has a significantly high exothermic initiation temperature. For instance, $LiFePO_4$ has such a high exothermic initiation temperature that an exothermic action is not observed even at 400° C. or higher according to the aforementioned measurement method. The phenomenon is conceivably derived from the olivine-type crystalline structure that oxygen atoms are of a hexagonal closed packing with an occupation of octahedral sites by Li and Fe and tetrahedral sites by P.

In the embodiment of the invention, a preferred example of the lithium-containing compounds having the lower exothermic initiation temperature, other than the lithium-containing compounds having the exothermic initiation temperature of 300° C. or higher is at least one kind selected from the group consisting of lithium-cobalt-based oxides and lithium-nickel-based oxides.

A preferred example of the lithium-cobalt-based oxides is a lithium-cobalt-based oxide represented by $LiCoO_2$ or $Li_aCo_{1-(b+c)}Mg_bM_cO_2$ where a, b, and c respectively satisfies $1 \leq a \leq 1.05$, $0.005 \leq b \leq 0.10$, and $0.005 \leq c \leq 0.10$, and M is at least one element selected from the group consisting of Al, Sr, and Ca. The value "a" representing the lithium content of 1 or larger enables to securely suppress the existence of electrochemically inactive impurities such as cobalt oxide, which suppresses lowering of the capacity because lithium salt as a raw material sufficiently exists. The value "a" of 1.05 or smaller enables to suppress lithium compound residues as impurities, which also suppresses lowering of the capacity because there is no likelihood that lithium salt as a raw material may excessively exist. The value "a" is defined in an uncharged state of the battery. When the value "b" satisfies the requirement: $0.005 \leq b \leq 0.10$, thermostability of the crystalline structure in a high temperature condition is improved due to the effect of Mg, which provides improved thermostability. Also, lowering of a discharging capacity caused by lattice distortion, structure breakage and particle cracking due to expansion and contraction of the crystalline structure resulting from charging and discharging can be alleviated, which provides improved cycle characteristics. The value "c" of 0.005 or larger stabilizes the crystalline structure and improves thermostability. The value "c" of 0.10 or smaller suppresses the capacity from lowering. For instance, the exothermic initiation temperature of $LiCoO_2$, and the exothermic initiation temperature of a lithium-cobalt-based oxide represented by $LiCo_{0.98}Mg_{0.02}O_2$ are respectively 202° C. and 208° C. according to the above measurement method.

A preferred example of the lithium-nickel-based oxides is a lithium-nickel-based oxide represented by $Li_aNi_{1-(b+c)}Co_b$-$M_cO_2$ where a, b, and c respectively satisfies $1 \leq a \leq 1.05$, $0.1 \leq b \leq 0.35$, and $0.005 \leq c \leq 0.30$, and M is at least one element selected from the group consisting of Al, Sr, and Ca. Application of the above composition ratio enables to improve the property of the $LiNiO_2$-based active material, which has a large capacity density and yet deteriorated reversibility due to a large crystalline structure change resulting from charging and discharging. The lithium nickel oxide is less costly than the $LiCoO_2$-based active material, and is particularly useful as a positive electrode active material for large-capacity batteries. The value "a" of 1 or larger enables to securely suppress the existence of electrochemically inactive impurities such as nickel oxide or cobalt oxide, which suppresses lowering of the capacity because lithium salt as a raw material sufficiently exists. The value "a" of 1.05 or smaller enables to suppress lithium compound residues as impurities, which also suppresses lowering of the capacity because there is less likelihood that lithium salt as a raw material may excessively exist. The value "a" is defined in an uncharged state of the battery. The value "b" may preferably satisfy the requirement: $0.10 \leq b \leq 0.35$. The value "b" of 0.1 or larger enables to securely obtain the aforementioned effect. The value "b" of 0.35 or smaller suppresses the capacity from lowering. The value "c" of 0.005 or larger improves thermostability, and the value "c" of 0.3 or smaller suppresses the capacity from lowering. For instance, the exothermic initiation temperature of the lithium-nickel-based oxide represented by $LiNi_{0.82}Co_{0.15}Al_{0.03}O_2$ is 215° C. according to the above measurement method.

The positive electrode for use in the lithium secondary battery according to the first embodiment is fabricated by the following process, for instance.

A binder, a conductive agent and the like are admixed to a predetermined amount of a lithium-containing compound having an exothermic initiation temperature of 300° C. or higher, e.g. an olivine-type lithium-phosphate-based compound to prepare a paste of positive electrode mixture. Likewise, prepared is a paste of positive electrode mixture containing a lithium-containing compound having a lower exothermic initiation temperature other than the lithium-containing compound having the exothermic initiation temperature of 300° C. or higher, e.g. a lithium-cobalt-based oxide. The positive electrode mixture paste containing the olivine-type lithium-phosphate-based compound is coated on a surface of a positive electrode current collector e.g. an aluminum foil, followed by drying, whereby a first mixture layer is formed. Subsequently, the positive electrode mixture paste containing the lithium-cobalt-based oxide is coated on the first mixture layer, followed by drying. Rolling the coat of the positive electrode mixture paste containing the lithium-cobalt-based oxide with the first mixture layer produces a positive electrode plate comprising a positive electrode film made of the two positive electrode mixture layers, for instance.

For the positive electrode current collector, any electron conductive material can be used as long as the material is free from a chemical change at charging and discharging potentials of the positive electrode material to be used. Generally, aluminum (Al) is an exemplified material of the positive electrode current collector. It is possible to use a material such as titanium (Ti), stainless steel (SUS), carbon, or a conductive resin, as a base material. Further, a base material obtained by processing a surface of Al or SUS with carbon or Ti may be used. In particular, aluminum or an aluminum alloy is preferred in the aspect of cost reduction, processability, and physical/chemical stability. The surfaces of these materials may be oxidized. Further alternatively, asperities may be formed on the surface of the positive electrode current collector by surface processing. Further alternatively, a thin film of aluminum or titanium may be formed on a resin sheet such as a polyethylene terephthalate (PET) sheet by vapor deposition or a like technique. Exemplified shapes of the positive electrode current collector may be, in addition to a foil, a film, a sheet, a net, a member processed by punching, a lath sheet, a porous member, a foamed member, a fibrous block, a molded member of non-woven fabric, and the like. The thickness of the positive electrode current collector is not specifically limited, but preferably is in the range of 1 to 50 μm.

The positive electrode film in the embodiment of the invention can be produced by: mixing and dispersing the aforementioned positive electrode active material, with the binder and the conductive agent according to needs, in a solvent to yield the mixture pastes; coating the mixture pastes on the positive electrode current collector, followed by drying; and rolling the dried coats of the mixture. Alternatively, the positive electrode film can be produced by a vacuum film forming process such as sputtering. Further alternatively, these techniques may be combined.

The binder to be added to the mixture paste may be one of thermoplastic resin materials and thermoset resin materials. Generally available resin materials such as polyethylene, polypropylene, polytetrafluoroethylene (PTFE), polyvinylidene fluoride (PVDF), or styrene butadiene rubber (SBR) may be used. These materials may be used alone or in combination.

An electron conductive material can be used as the conductive agent to be added to the mixture paste. Examples of the electron conductive material are: graphites such as natural graphite e.g. scale-shaped graphite, synthetic graphite, and exfoliated graphite; carbon blacks such as acetylene black and ketjen black; conductive fibers such as carbon fibers and metallic fibers; metallic powders such as copper powders and nickel powders; and organic conductive materials such as polyphenylene derivatives. These materials may be used alone or in combination of two or more kinds. Among the conductive agents, microparticulate and high conductive carbon blacks such as acetylene black and ketjen black are preferred. The content of the conductive agent to be added is not specifically limited as far as the content does not impair the effects of the invention.

An organic solvent such as N-methyl-2-pyrrolidone (NMP) can be used as the solvent for producing the mixture paste, but is not limited thereto.

The method of producing the mixture paste by mixing and dispersing the positive electrode active material, with the conductive agent and the binder, according to needs, in the solvent is not specifically limited. For instance, a planetary mixer, a homo mixer, a pin mixer, a kneader, a homogenizer, or a like device can be used. These devices may be used alone or in combination. Also, it is possible to add a thickener, various dispersants, a surfactant, a stabilizer, or the like, according to needs, in mixing and dispersing the mixture paste.

The manners of coating the mixture paste onto the positive electrode current collector, drying, and rolling are not specifically limited. A coat of the mixture paste obtained by the mixing and the dispersion can be easily formed with use of a slit die coater, a reverse roll coater, a lip coater, a blade coater, a knife coater, a gravure coater, a dip coater, or a like device. Natural drying is preferred. However, it is preferable to dry the coat at a temperature of 70° C. to 200° C. considering productivity. It is preferred to roll the coat by a roll press machine so that the resultant positive electrode film has a predetermined thickness.

The lithium secondary battery of the first embodiment is produced by: opposing the positive electrode produced by the aforementioned process, and a negative electrode to each other via a separator; winding or layering the positive electrode and the negative electrode one over the other to form an electrode member; and sealably encasing the electrode member with a non-aqueous electrolyte in a battery casing.

The negative electrode is not specifically limited. Examples of the negative electrode active material are: carbon-based materials such as graphite; metals, alloys, oxide materials, carbide materials, and nitride materials including silicon (Si) and tin (Sn); and salts thereof. These known materials may be used alone or in combination. The negative electrode is produced, for instance, by: mixing and dispersing the negative electrode active material with a binder, a conductive agent, and a thickener according to needs in a solvent to prepare a mixture paste; applying a coat of the mixture paste on a copper-made negative electrode current collector, followed by drying; rolling the coating so that the coating film has a predetermined thickness; and cutting into a predetermined shape.

The non-aqueous electrolyte may not only include a liquid electrolyte but also include a gel or solid electrolyte. An example of the liquid electrolyte is obtained by dissolving a solute with an additive according to needs in a non-aqueous solvent. Preferred examples of the non-aqueous solvent are carbonates such as ethylene carbonate, dimethyl carbonate, and ethylmethyl carbonate, but are not limited thereto. Use of two or more kinds of the non-aqueous solvent is preferred. A preferred example of the solute is a lithium salt such as $LiPF_6$ and $LiBF_4$, but is not limited thereto. Examples of the additive are, for instance, vinylene carbonate and cyclohexyl benzene.

The separator is not specifically limited, and a microporous film made of a polyolefin resin material such as polyethylene or polypropylene can be used.

The lithium secondary battery according to the first embodiment of the invention may be of any shape including a coin shape, a button shape, a sheet shape, a laminated shape, a cylindrical shape, a flat shape, a square shape, and a large-sized shape to be used in an electric vehicle or a like machine.

Second Embodiment

A positive electrode, for use in a lithium secondary battery, according to a second embodiment of the invention has features that a positive electrode film to be carried on a positive electrode current collector contains, as a positive electrode active material, two or more kinds of lithium-containing compounds having exothermic initiation temperatures different from each other, at least one kind of the two or more kinds of lithium-containing compounds has the exothermic initiation temperature of 300° C. or higher, and a content of the lithium-containing compound having the exothermic initiation temperature of 300° C. or higher is increased in a thickness direction of the positive electrode film from an outermost layer of the positive electrode film toward the positive electrode current collector.

Figure 2:
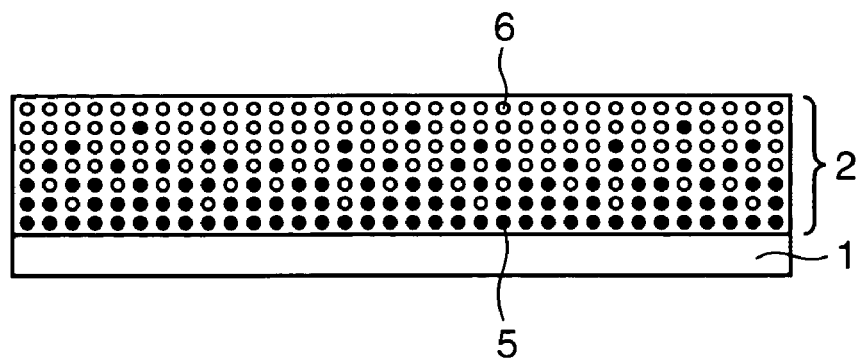
FIG. 2 is a schematic cross-sectional view showing an example of a positive electrode for use in a lithium secondary battery in accordance with a second embodiment of the invention.

The positive electrode according to the second embodiment is described referring to FIG. 2. Since the positive electrode current collector and the positive electrode active material in the second embodiment are identical or equivalent to those in the first embodiment, repeated description thereof will be omitted, and features of the second embodiment different from those of the first embodiment will be described herein.

FIG. 2 is a schematic cross-sectional view showing an example of the positive electrode according to the second embodiment.

The positive electrode comprises a positive electrode current collector 1, and a positive electrode film 2 formed on the positive electrode current collector 1. The positive electrode film 2 contains, as a positive electrode active material, lithium-containing compounds 5 and 6 of two kinds having exothermic initiation temperatures different from each other. One of the lithium-containing compounds (in this embodiment, the lithium-containing compound 5) has the exothermic initiation temperature of 300° C. or higher. The content of the lithium-containing compound 5 having the exothermic initiation temperature of 300° C. or higher is increased in the thickness direction of the positive electrode film 2 from the outermost layer of the positive electrode film 2 toward the positive electrode current collector 1.

With the thus-constructed positive electrode, even if high Joule heat generates resulting from internal short-circuiting by contact of a nail with the positive electrode current collector 1 in a nail penetration test, thermal runaway of the positive electrode is suppressed, which prevents further overheating of the battery because a portion of the positive electrode film 2 closest to the positive electrode current collector 1 contains the largest content of the lithium-containing compound 5 having the exothermic initiation temperature of 300° C. or higher. Also, the content of the lithium-containing compound other than the lithium-containing compound 5, i.e. the lithium-containing compound 6 having a lower exothermic initiation temperature than the lithium-containing compound 5 having the exothermic initiation temperature of 300° C. or higher, and yet a significantly large capacity density, is increased in the thickness direction of the positive electrode film 2 toward the outermost layer of the positive electrode film 2, which enables to make the positive electrode capacity large. Consequently, this provides a positive electrode capable of securely suppressing overheating of a battery in the nail penetration test, and having a large capacity.

The lithium-containing compound 5 having the exothermic initiation temperature of 300° C. or higher may be stepwise or sequentially increased in the thickness direction of the positive electrode film 2 from the outermost layer of the positive electrode film 2 toward the positive electrode current collector 1.

The portion of the positive electrode film 2 closest to the positive electrode current collector 1 may contain the lithium-containing compound 5 having the exothermic initiation temperature of 300° C. or higher with a content ratio of 60% or more by mass, more preferably 80% or more by mass, particularly preferably 90% or more by mass, and most preferably 100% by mass relative to the total contents of the two or more kinds of lithium-containing compounds having the exothermic initiation temperatures different from each other contained in the positive electrode film in the aspect of suppressing thermal runaway of the positive electrode. Also, at the outermost layer region of the positive electrode film 2 farthest away from the positive electrode current collector 1, a content ratio of the lithium-containing compound 6 other than the lithium-containing compound 5 having the exothermic initiation temperature of 300° C. or higher may preferably be 60% or more by mass, more preferably 80% or more by mass, and particularly preferably 90% or more by mass relative to the total contents of the two or more kinds of lithium-containing compounds having the exothermic initiation temperatures different from each other contained in the positive electrode film in the aspect of increasing the capacity density of the positive electrode.

The positive electrode according to the second embodiment i.e. the positive electrode with the positive electrode film containing the two or more kinds of lithium-containing compounds with the exothermic initiation temperatures different from each other, and having the feature that the content of the lithium-containing compound with the exothermic initiation temperature of 300° C. or higher is increased in the thickness direction of the positive electrode film from the outermost layer of the positive electrode film toward the positive electrode current collector can be produced by the following process, for instance.

As a positive electrode active material, mixtures of two kinds of lithium-containing compounds are prepared, in which the mixing ratios of the lithium-containing compound having the exothermic initiation temperature of 300° C. or higher e.g. an olivine-type lithium-phosphate-based compound, and the lithium-containing compound other the lithium-containing compound having the exothermic initiation temperature of 300° C. or higher e.g. a lithium-cobalt-based oxide are different from each other, with the total contents of the olivine-type lithium-phosphate-based compound and the lithium-cobalt-based oxide being fixed. Then, positive electrode mixture pastes are prepared by admixing a positive electrode binder, a conductive agent, and the like to each of the mixtures. The positive electrode mixture paste containing the largest content of the olivine-type lithium-phosphate-based compound is coated on a surface of a positive electrode current collector i.e. an aluminum foil, followed by drying. Then, the positive electrode mixture paste containing a smaller content of the olivine-type lithium-phosphate-based compound is coated on the first coat, followed by drying. Then, the positive electrode mixture paste containing the smallest content of the olivine-type lithium-phosphate-based compound, in other words, the positive electrode mixture paste containing the largest content of the lithium-cobalt-based oxide is coated on the second coat, followed by drying. Rolling the obtained layered coats enables to produce a positive electrode plate having a positive electrode film, in which the content of the olivine-type lithium-phosphate compound is stepwise increased in the thickness direction of the positive electrode film from the outermost layer of the positive electrode film toward the positive electrode current collector.

Alternatively, the positive electrode mixture pastes may be sequentially coated one over the other prior to drying. For instance, a predetermined amount of the positive electrode mixture paste containing the smallest content of the olivine-type lithium-phosphate-based compound is gradually admixed to a same amount of the positive electrode mixture paste containing the largest content of the olivine-type lithium-phosphate compound for a certain time. The positive electrode mixture pastes having sequentially different mixing ratios of the olivine-type lithium-phosphate-based compound, which are obtained during the gradual addition, are coated one over the other stepwise, followed by drying. Rolling the layered coats enables to produce a positive electrode plate having a positive electrode film, in which the content of the olivine-type lithium-phosphate-based compound is sequentially increased in the thickness direction of the positive electrode film from the outermost layer of the positive electrode film toward the positive electrode current collector.

Similarly to the process of the first embodiment, the inventive lithium secondary battery can be produced with use of the positive electrode of the second embodiment by: opposing the positive electrode and a negative electrode to each other via a separator; winding or layering the positive electrode and the negative electrode one over the other to form an electrode member; and sealably encasing the electrode member with a non-aqueous electrolyte in a battery casing.

Although the present invention has been described in terms of the presently preferred embodiments, such embodiments are illustrative in all aspects and are not to be interpreted as restrictive. It is to be understood that various alterations and modifications may be embodied without departing from the scope of the present invention.

In the following, some of the examples pertaining to the invention are illustrated. The invention, however, is not limited to the below-mentioned examples.

EXAMPLES (i) Preparation of Positive Electrode Active Material

Positive electrode active materials a-1 through a-6 were prepared by the following processes (i-1) through (i-6), respectively.

(i-1) Preparation of Positive Electrode Active Material a-1

$Li_2CO_3$ and $CoCO_3$ were mixed with a predetermined molar ratio, the mixture was sintered at 900° C. for 10 hours, followed by pulverization and sorting. Thus, the positive electrode active material a-1 represented by the chemical formula: $LiCoO_2$ was yielded.

(i-2) Preparation of Positive Electrode Active Material a-2

An aqueous solution containing cobalt sulfate with a concentration of 0.98 mol/L, and magnesium sulfate with a concentration of 0.02 mol/L was continuously fed to a reaction tank, and sodium hydroxide was added dropwise to the reaction tank so that pH of the aqueous solution was in the range of 10 to 13, whereby a precursor active material was synthesized. The precursor active material was sufficiently rinsed with water, and dried. As a result, hydroxide expressed by $Co_{0.98}Mg_{0.02}(OH)_2$ was yielded. The precursor active material and lithium carbonate were mixed so that the molar ratio of lithium, cobalt, and magnesium was 1:0.98:0.02. The mixture was pre-sintered at 600° C. for 10 hours, and pulverized. Then, the pulverized substance was sintered at 900° C. for 10 hours, followed by pulverization and sorting. Thus, the positive electrode active material a-2 represented by the chemical formula: $LiCo_{0.98}Mg_{0.02}O_2$ was yielded.

(i-3) Preparation of Positive Electrode Active Material a-3

An aqueous solution containing nickel sulfate with a concentration of 0.82 mol/L, and cobalt sulfate with a concentration of 0.15 mol/L, and an aqueous solution containing aluminum sulfate with a concentration of 0.03 mol/L were continuously fed to a reaction tank, and sodium hydroxide was added dropwise to the reaction tank so that pH of the aqueous solution was in the range of 10 to 13, whereby a precursor active material was synthesized. The precursor active material was sufficiently rinsed with water, and dried. As a result, hydroxide expressed by $Ni_{0.82}Co_{0.15}Al_{0.03}(OH)_2$ was yielded. The precursor active material and lithium carbonate were mixed so that the molar ratio of lithium, nickel, cobalt, and aluminum was 1:0.82:0.15:0.03. The mixture was pre-sintered at 500° C. for 7 hours under oxygen atmosphere, and pulverized. Then, the pulverized substance was sintered at 800° C. for 15 hours, followed by pulverization and sorting. Thus, the positive electrode active material a-3 represented by the chemical formula: $LiNi_{0.82}Co_{0.15}Al_{0.03}O_2$ was yielded.

(i-4) Preparation of Positive Electrode Active Material a-4

An aqueous solution containing nickel sulfate, manganese sulfate, and cobalt sulfate with equimolar concentration was continuously fed to a reaction tank, and sodium hydroxide was added dropwise to the reaction tank so that pH of the aqueous solution was in the range of 10 to 13, whereby a precursor active material was synthesized. The precursor active material was sufficiently rinsed with water, and dried. As a result, hydroxide expressed by $Ni_{1/3}Mn_{1/3}Co_{1/3}(OH)_2$ was yielded. The precursor active material and lithium carbonate were mixed so that the molar ratio of lithium, nickel, manganese, and cobalt was 3:1:1:1. The mixture was pre-sintered at 500° C. for 7 hours under oxygen atmosphere, and pulverized. Then, the pulverized substance was sintered at 800° C. for 15 hours, followed by pulverization and sorting. Thus, the positive electrode active material a-4 represented by the chemical formula: $LiNi_{1/3}Mn_{1/3}Co_{1/3}O_2$ was yielded.

(i-5) Preparation of Positive Electrode Active Material a-5

Manganese dioxide and lithium carbonate were mixed so that the molar ratio of lithium and manganese was 1:2. The mixture was sintered at 850° C. for 10 hours under air atmosphere, followed by pulverization and sorting. Thus, the positive electrode active material a-5 represented by the chemical formula: $LiMn_2O_4$ was yielded.

(i-6) Preparation of Positive Electrode Active Material a-6

Lithium carbonate $Li_2CO_3$, iron oxalate $FeC_2O_4 \cdot 2H_2O$, and diammonium hydrogenphosphate $(NH_4)_2HPO_4$ were weighed so that the stoichiometric ratio thereof was 0.5:1.0:1.0. The weighed compounds were sufficiently mixed in a mortar. The mixture was sintered at 600° C. for 15 hours under the atmosphere of $Ar-H_2$. Thus, the positive electrode active material a-6 represented by the chemical formula: $LiFePO_4$ was yielded.

Thermostabilities of the positive electrode active materials a-1 through a-6 in charged states were evaluated with use of a differential scanning calorimeter (DSC) (Rigaku TAS300). First, 10 parts by weight of acetylene black as a conductive agent, and 5 parts by weight of PTFE as a binder were admixed to 85 parts by weight of each of the positive electrode active materials a-1 through a-6, followed by a shape forming, whereby sheet-like electrodes were produced. A measurement cell provided with each of the electrodes as a working electrode and a counter electrode made of lithium metal was charged with a constant current of 0.2 mA/cm² up to 4.25 V. After the charging, positive electrodes of a proper amount were sampled, and each of the sampled positive electrodes was sealed in a stainless steel pan used for fire-fighting operation. The stainless steel pans were heated with a temperature rising rate of 10° C. per minute, and an onset temperature from the baseline in a profile obtained by the DSC was defined as the exothermic initiation temperature. The exothermic initiation temperatures of the respective positive electrode active materials measured under the aforementioned conditions were as follows: the positive electrode active material a-1 showed the exothermic initiation temperature of 202° C.; the positive electrode active material a-2 showed the exothermic initiation temperature of 208° C.; the positive electrode active material a-3 showed the exothermic initiation temperature of 215° C.; the positive electrode active material a-4 showed the exothermic initiation temperature of 305° C.; the positive electrode active material a-5 showed the exothermic initiation temperature of 320° C.; and the exothermic initiation temperature of the positive electrode active material a-6 was unable to measure because the temperature was over 400° C.

(ii) Preparation of Positive Electrode Mixture Paste

The below-mentioned positive electrode mixture pastes a-11 through a-81 were prepared with use of the positive electrode active materials a-1 through a-6.

(ii-1) Preparation of Positive Electrode Mixture Paste a-11

3 kg of the positive electrode active material a-1, 0.5 kg of NMP solution containing 12% by weight of PVDF produced by Kureha Kagaku Kogyo Kabushiki Kaisha as a positive electrode binder, 90 g of acetylene black as a conductive agent, and a proper amount of NMP were mixed by a planetary mixer, whereby the positive electrode mixture paste a-11 was prepared.

(ii-2) Preparation of Positive Electrode Mixture Paste a-21

The positive electrode mixture paste a-21 was prepared by a similar process as the preparation process of the positive electrode mixture paste a-11 except that the positive electrode active material a-2 was used in place of the positive electrode active material a-1.

(ii-3) Preparation of Positive Electrode Mixture Paste a-31

The positive electrode mixture paste a-31 was prepared by a similar process as the preparation process of the positive electrode mixture paste a-11 except that the positive electrode active material a-3 was used in place of the positive electrode active material a-1.

(ii-4) Preparation of Positive Electrode Mixture Paste a-41

The positive electrode mixture paste a-41 was prepared by a similar process as the preparation process of the positive electrode mixture paste a-11 except that the positive electrode active material a-4 was used in place of the positive electrode active material a-1.

(ii-5) Preparation of Positive Electrode Mixture Paste a-51

The positive electrode mixture paste a-51 was prepared by a similar process as the preparation process of the positive electrode mixture paste a-11 except that the positive electrode active material a-5 was used in place of the positive electrode active material a-1.

(ii-6) Preparation of Positive Electrode Mixture Paste a-61

The positive electrode mixture paste a-61 was prepared by a similar process as the preparation process of the positive electrode mixture paste a-11 except that a mixture of the positive electrode active materials a-3 and a-4 with a weight ratio of 2:1 was used in place of the positive electrode active material a-1.

(ii-7) Preparation of Positive Electrode Mixture Paste a-71

The positive electrode mixture paste a-71 was prepared by a similar process as the preparation process of the positive electrode mixture paste a-11 except that a mixture of the positive electrode active materials a-3 and a-5 with a weight ratio of 3:1 was used in place of the positive electrode active material a-1.

(ii-8) Preparation of Positive Electrode Mixture Paste a-81

The positive electrode mixture paste a-81 was prepared by a similar process as the preparation process of the positive electrode mixture paste a-11 except that the positive electrode active material a-6 was used in place of the positive electrode active material a-1.

(iii) Preparation of Positive Electrode

The following positive electrodes b-1 through b-11 were prepared with use of the positive electrode mixture pastes a-11 through a-81.

(iii-1) Preparation of Positive Electrode b-1

The positive electrode mixture paste a-41 was coated on both surfaces of an aluminum foil with a thickness of 15 μm, as a positive electrode current collector of a positive electrode, whereby first mixture layers were formed, followed by drying. Then, the positive electrode mixture paste a-11 was coated on the first mixture layers, followed by drying. After the drying, rolling the layered coats produced a positive electrode film made of the mixture layers containing the two kinds of the positive electrode mixture pastes. Thus, the positive electrode b-1 with 163 μm in thickness including the aluminum foil and the positive electrode film was obtained. The average thickness of the outermost mixture layers containing the positive electrode active material a-1 was 128 μm, and the average thickness of the first mixture layers closest to the positive electrode current collector and containing the positive electrode active material a-4 was 20 μm. The ratio of the average thickness of the first mixture layers to the average thickness of the outermost mixture layers was 16:100.

(iii-2) Preparation of Positive Electrode b-2

The positive electrode b-2 was prepared by a similar process as the preparation process of the positive electrode b-1 except that the positive electrode mixture paste a-41 was coated on both surfaces of an aluminum foil to form first mixture layers, followed by drying, and then the positive electrode mixture paste a-21 was coated on the first mixture layers, followed by drying. The average thickness of the outermost mixture layers containing the positive electrode active material a-2 was 125 μm, and the average thickness of the first mixture layers closest to the positive electrode current collector and containing the positive electrode active material a-4 was 20 μm. The ratio of the average thickness of the first mixture layers to the average thickness of the outermost mixture layers was 16:100.

(iii-3) Preparation of Positive Electrode b-3

The positive electrode b-3 was prepared by a similar process as the preparation process of the positive electrode b-1 except that the positive electrode mixture paste a-41 was coated on both surfaces of an aluminum foil to form first mixture layers, followed by drying, and then the positive electrode mixture paste a-31 was coated on the first mixture layers, followed by drying. The average thickness of the outermost mixture layers containing the positive electrode active material a-3 was 125 μm, and the average thickness of the first mixture layers closest to the positive electrode current collector and containing the positive electrode active material a-4 was 20 μm.

(iii-4) Preparation of Positive Electrode b-4

The positive electrode b-4 was prepared by a similar process as the preparation process of the positive electrode b-1 except that the positive electrode mixture paste a-51 was coated on both surfaces of an aluminum foil to form first mixture layers, followed by drying, and then the positive electrode mixture paste a-31 was coated on the first mixture layers, followed by drying. The average thickness of the outermost mixture layers containing the positive electrode active material a-3 was 130 μm, and the average thickness of the first mixture layers closest to the positive electrode current collector and containing the positive electrode active material a-5 was 15 μm. The ratio of the average thickness of the first mixture layers to the average thickness of the outermost mixture layers was 12:100.

(iii-5) Preparation of Positive Electrode b-5

The positive electrode b-5 was prepared by a similar process as the preparation process of the positive electrode b-1 except that the positive electrode mixture paste a-41 was coated on both surfaces of an aluminum foil to form first mixture layers, followed by drying, and then the positive electrode mixture paste a-61 was coated on the first mixture layers, followed by drying. The average thickness of the outermost mixture layers containing the mixture of the positive electrode active materials a-3 and a-4 was 130 μm, and the average thickness of the first mixture layers closest to the positive electrode current collector and containing the positive electrode active material a-4 was 15 μm.

(iii-6) Preparation of Positive Electrode b-6

The positive electrode b-6 was prepared by a similar process as the preparation process of the positive electrode b-1 except that the positive electrode mixture paste a-51 was coated on both surfaces of an aluminum foil to form first mixture layers, followed by drying, and then the positive electrode mixture paste a-71 was coated on the first mixture layers, followed by drying. The average thickness of the outermost mixture layers containing the mixture of the positive electrode active materials a-3 and a-5 was 130 μm, and the average thickness of the first mixture layers closest to the positive electrode current collector and containing the positive electrode active material a-5 was 15 μm.

(iii-7) Preparation of Positive Electrode b-7

The positive electrode b-7 was prepared by a similar process as the preparation process of the positive electrode b-1 except that the positive electrode mixture paste a-51 was coated on both surfaces of an aluminum foil, followed by drying. The average thickness of the mixture layers containing the positive electrode active material a-5 was 140 μm.

(iii-8) Preparation of Positive Electrode b-8

The positive electrode b-8 was prepared by a similar process as the preparation process of the positive electrode b-1 except that the positive electrode mixture paste a-31 was coated on both surfaces of an aluminum foil, followed by drying. The average thickness of the mixture layers containing the positive electrode active material a-3 was 145 μm.

(iii-9) Preparation of Positive Electrode b-9

The positive electrode b-9 was prepared by a similar process as the preparation process of the positive electrode b-1 except that the positive electrode mixture paste a-31 was coated on both surfaces of an aluminum foil to form first mixture layers, followed by drying, and then the positive electrode mixture paste a-51 was coated on the first mixture layers, followed by drying. The average thickness of the outermost mixture layers containing the positive electrode active material a-5 was 15 μm, and the average thickness of the first mixture layers closest to the positive electrode current collector and containing the positive electrode active material a-3 was 130 μm.

(iii-10) Preparation of Positive Electrode b-10

The positive electrode b-10 was prepared by a similar process as the preparation process of the positive electrode b-1 except that the positive electrode mixture paste a-81 was coated on both surfaces of an aluminum foil to form first mixture layers, followed by drying, and then the positive electrode mixture paste a-31 was coated on the first mixture layers, followed by drying. The average thickness of the outermost mixture layers containing the positive electrode active material a-3 was 140 μm, and the average thickness of the first mixture layers closest to the positive electrode current collector and containing the positive electrode active material a-6 was 10 μm. The ratio of the average thickness of the first mixture layers to the average thickness of the outermost mixture layers was 7:100.

(iii-11) Preparation of Positive Electrode b-11

Positive electrode mixture pastes with different mixing ratios of the positive electrode mixture pastes 31 and 41 were sequentially coated on both surfaces of an aluminum foil, wherein the positive electrode mixture pastes with the different mixing ratios were obtained by gradually admixing, to a predetermined amount of the positive electrode mixture paste a-41, the positive electrode mixture paste a-31 of the same amount as the positive electrode mixture paste a-41 for about one minute, followed by drying. The positive electrode b-11 was prepared by a similar process as the preparation process of the positive electrode b-1 except that the content of the positive electrode active material a-4 was sequentially increased, in other words, the content of the positive electrode active material a-3 was sequentially decreased in the thickness direction of the positive electrode film from the outermost layer toward the positive electrode current collector. The average thickness of the mixture layers on the both surfaces of the collector was 150 μm.

(iv) Preparation of Negative Electrode (iv-1) Preparation of Negative Electrode c-1

3 kg of synthetic graphite as a negative electrode active material, 75 g of an aqueous dispersant containing 40% by weight of a modified styrene-butadiene copolymer available under the trade name of "BM-400B" (product of Nihon Zeon), as a negative electrode binder, 30 g of CMC as a thickener, and a proper amount of water were mixed by a planetary mixer, whereby a negative electrode mixture was prepared. The negative electrode mixture was coated on both surfaces of a copper foil of 10 μm in thickness, as a negative electrode current collector, except for a portion of the negative electrode where a lead wire is to be connected. After drying the layered coats, rolling the layered coats produced a negative electrode plate. The negative electrode plate including the copper foil and the negative electrode mixture layers had a thickness of 180 μm.

(iv-2) Preparation of Negative Electrode c-2

Silicon (Si) with purity of 99.999% in the form of an ingot (product of Furuuchi Kagaku) was put in a graphite crucible. An electrolytic copper foil as a negative electrode current collector sheet (product of Furukawa Circuit Foil Co., Ltd., thickness: 18 μm) was fixedly attached to a water-cooled roller installed in a vacuum deposition system. The graphite crucible containing the silicon ingot was placed beneath the electrolytic copper foil. A nozzle for supplying an oxygen gas between the crucible and the copper foil was provided, and an oxygen gas (product of Nippon Sanso Corporation, purity: 99.7%) was fed via the nozzle into the vacuum deposition system with a flow rate of 20 sccm (20 cm$^3$ per minute). Vapor deposition was conducted with use of an electron gun. The vapor deposition condition was an acceleration voltage of −8 kV, and a current of 500 mA.

The thickness of the negative electrode film, containing the negative electrode active material, on one side of the negative electrode was about 18 μm. The oxygen amount contained in the negative electrode was substantially equivalent to the composition expressed by $SiO_{0.3}$ according to a combustion measurement method.

(v) Preparation of Non-Aqueous Electrolyte

A non-aqueous electrolyte was prepared by dissolving $LiPF_6$ with a concentration of 1 mol/L in a mixture of a non-aqueous solvent containing ethylene carbonate (EC), dimethyl carbonate (DMC), and ethylmethyl carbonate (EMC) having a volumetric ratio of 2:3:3.

(vi) Preparation of Cylindrical Battery

A positive electrode lead wire made of aluminum was attached to each of the positive electrodes by an ultrasonic welding. Likewise, a negative electrode lead wire made of copper was attached to each of the negative electrodes by the ultrasonic welding. Then, the positive electrode and the negative electrode were wound into a cylindrical shape, with a band-shaped microporous polyethylene separator having a width larger than the widths of the positive electrode and the negative electrode and being disposed between the positive electrode and the negative electrode, whereby an electrode assembly was formed. Polypropylene insulating rings were placed respectively on the top and the bottom of the electrode assembly, and the electrode assembly with the rings were put in a battery case. After a necking portion was formed on an upper portion of the battery casing, the aforementioned electrolyte was poured into the battery casing. Sealing the battery casing by a sealing plate produced a cylindrical battery with the diameter of 18 mm and the total height of 65 mm.

Examples 1 through 7 were prepared with use of the positive electrodes b-1, b-2, b-3, b-4, b-5, b-6, and b-10, and the negative electrode c-1, respectively. Examples 8 and 9 were prepared with use of the positive electrodes b-3 and b-10, and the negative electrode c-2, respectively. Example 10 was prepared with use of the positive electrode b-11 and the negative electrode c-1. Comparative Examples 1 through 3 were prepared with use of the positive electrodes b-7, b-8, and b-9, and the negative electrode c-1, respectively.

The following evaluation was made with respect to the batteries as Examples 1 through 10, and Comparative Examples 1 through 3 after predetermined charging and discharging were conducted.

(Battery Capacity Measurement)

The batteries were charged and discharged under the following condition. The discharging capacities of the batteries are shown in Table 1.

Constant current charging: constant current of 1,680 mA, and terminal voltage of 4.2 V Constant voltage charging: terminal current of 240 mA, and suspension period of 30 minutes Constant current discharging: constant current of 480 mA, terminal voltage of 3.0V, and suspension period of 30 minutes (Nail Penetration Test Condition)

After the capacity measurement, the batteries were charged under the same condition as the capacity measurement condition. Iron nails each with the diameter of 1.9 mm were allowed to penetrate the batteries with a penetration speed of 5 mm/s in a thermostatic tank under the temperature of 20° C. The voltages of the batteries in the nail penetration test were monitored. Specifically, a battery voltage one second after initiation of short-circuiting by the nail penetration, and a minimal battery voltage observed in the duration were measured. The voltage of each battery immediately before the short-circuiting was 4.17 V.

The measurement results are as shown in Table 1.

TABLE 1

| Battery | Positive electrode | Negative electrode | Battery Capacity (mAh) | Minimal Battery Voltage (V) | Battery Voltage after 1 sec. (V) |
|---|---|---|---|---|---|
| Ex. 1 | b-1 | c-1 | 2445 | 3.46 | 3.99 |
| Ex. 2 | b-2 | c-1 | 2430 | 3.50 | 4.07 |
| Ex. 3 | b-3 | c-1 | 2780 | 3.66 | 4.02 |
| Ex. 4 | b-4 | c-1 | 2735 | 3.68 | 4.03 |
| Ex. 5 | b-5 | c-1 | 2645 | 3.76 | 4.11 |

TABLE 1-continued

| Battery | Positive electrode | Negative electrode | Battery Capacity (mAh) | Minimal Battery Voltage (V) | Battery Voltage after 1 sec. (V) |
|---|---|---|---|---|---|
| Ex. 6 | b-6 | c-1 | 2585 | 3.77 | 4.08 |
| Ex. 7 | b-10 | c-1 | 2695 | 3.86 | 4.13 |
| Ex. 8 | b-3 | c-2 | 3025 | 3.79 | 4.14 |
| Ex. 9 | b-10 | c-2 | 3010 | 3.93 | 4.16 |
| Ex. 10 | b-11 | c-1 | 2765 | 3.70 | 4.01 |
| C. Ex. 1 | b-7 | c-1 | 1980 | 3.95 | 4.09 |
| C. Ex. 2 | b-8 | c-1 | 2700 | 0.25 | 0.25 |
| C. Ex. 3 | b-9 | c-1 | 2210 | 0.56 | 0.56 |

The positive electrodes of Examples 1 through 4, and 7 through 9 each has dual mixture layers on each of the both surfaces of the aluminum foil, wherein the respective mixture layer contains one kind of lithium-containing compound having an exothermic initiation temperature different from each other, and the first mixture layer closest to the aluminum foil contains the lithium-containing compound having the exothermic initiation temperature of 300° C. or higher. Specifically, the first mixture layers in Examples 1 through 3, and 8 contain the lithium-nickel-manganese-cobalt oxide, the first mixture layer in Example 4 contains the lithium-manganese oxide, and the first mixture layers in Examples 7 and 9 contain the olivine-type lithium-phosphate compound, respectively.

In the positive electrodes of Examples 5, 6 and 10, the content of the lithium-containing compound with the exothermic initiation temperature of 300° C. or higher is increased in the thickness direction of the positive electrode film from the outermost layer toward the positive electrode current collector. Specifically, the content of the lithium-nickel-manganese-cobalt oxide in Example 5 is stepwise increased from 33% to 100%; the content of the lithium-manganese oxide in Example 6 is stepwise increased from 25% to 100%; and the content of the lithium-nickel-manganese-cobalt oxide in Example 10 is sequentially increased.

Examples 1 through 10 greatly suppress voltage lowering by the short-circuiting in the nail penetration test, as compared with Comparative Example 2 that the mixture layers essentially consist of the lithium-nickel oxide having a low exothermic initiation temperature.

Particularly, among the lithium-containing compounds having the exothermic initiation temperature of 300° C. or higher, Examples 7 and 9 containing the olivine-type lithium-phosphate compound are advantageous in suppressing voltage lowering.

The superior effects in suppressing voltage lowering in the nail penetration test show that the inclusion of the lithium-containing compound having the exothermic initiation temperature of 300° C. or higher in the first mixture layer closest to the positive electrode current collector, or in the positive electrode film portion closest to the positive electrode current collector enables to securely suppress overheating of the lithium secondary battery even if high Joule heat generates by internal short-circuiting in the nail penetration test.

Comparative Example 3 has the first mixture layer closest to the aluminum foil containing the lithium-nickel oxide having a low exothermic initiation temperature, and the outer mixture layer containing the lithium-manganese oxide having a high exothermic initiation temperature. Comparative Example 3 is different from Example 4 in the layer construction that the lithium-containing compounds contained in the first mixture layer and the outer mixture layer are opposite to each other. Comparative Example 3 seldom shows a voltage lowering suppressive effect in the nail penetration test, which obviously teaches low reliability in the nail penetration test.

The lithium-containing compounds contained in Examples 1 through 10 not only have the effect of suppressing the voltage from lowering by short-circuiting but also are effective in recovering the voltage one second after the short-circuiting to a value higher than the lowest voltage in a short-circuited state i.e. the minimal battery voltage, as compared with Comparative Examples 2 and 3. Specifically, containing the lithium-containing compound having the exothermic initiation temperature of 300° C. or higher in the first mixture layer closest to the positive electrode current collector, or in the positive electrode film portion closest to the positive electrode current collector enables to control charging and discharging, while utilizing a potential difference between the minimal voltage at the short-circuiting and the battery voltage at the recovery.

On the other hand, Comparative Example 1 provided with the positive electrode containing the positive electrode active material essentially consisting of the lithium-manganese oxide having the exothermic initiation temperature of 300° C. or higher showed capacity lowering due to a low capacity density of the lithium-manganese oxide, despite a high voltage lowering suppressive effect in the nail penetration test.

As mentioned above, an aspect of the invention is directed to a positive electrode, for use in a lithium secondary battery, comprising a positive electrode current collector, and a positive electrode film which is carried on the positive electrode current collector and includes a plurality of mixture layers, wherein the positive electrode film contains, as a positive electrode active material, two or more kinds of lithium-containing compounds having exothermic initiation temperatures different from each other, at least one kind of the two or more kinds of lithium-containing compounds has the exothermic initiation temperature of 300° C. or higher, and a first mixture layer of the plural mixture layers, closest to the positive electrode current collector, contains at least one kind of the lithium-containing compound having the exothermic initiation temperature of 300° C. or higher.

In the above arrangement, containing at least one kind of the lithium-containing compound having the exothermic initiation temperature of 300° C. or higher in the first mixture layer closest to the positive electrode current collector which generates high Joule heat by internal short-circuiting in a nail penetration test enables to securely suppress an exothermic action of the positive electrode by the internal short-circuiting to thereby minimize thermal runaway of the positive electrode. The positive electrode film of the invention contains the lithium-containing compound other than the lithium-containing compound having the exothermic initiation temperature of 300° C. or higher, in other words, the lithium-containing compound having a low exothermic initiation temperature and yet a significantly large capacity density, which enables to make the positive electrode capacity large as a whole. Consequently, this provides a lithium secondary battery positive electrode capable of securely suppressing overheating of a battery in the nail penetration test, and having a large capacity.

Preferably, the positive electrode active material in the first mixture layer may additionally contain the lithium-containing compound other than the lithium-containing compound having the exothermic initiation temperature of 300° C. or higher. In this arrangement, preferably, the content of the lithium-containing compound having the exothermic initiation temperature of 300° C. or higher is larger than the content of the lithium-containing compound other than the lithium-containing compound having the exothermic initiation temperature of 300° C. or higher. This enables to securely suppress an exothermic action of the positive electrode by the internal short-circuiting, and to make the positive electrode capacity large.

Preferably, the positive electrode active material in the first mixture layer may essentially consist of the lithium-containing compound having the exothermic initiation temperature of 300° C. or higher. Containing solely the lithium-containing compound having the exothermic initiation temperature of 300° C. or higher in the first mixture layer that generates high Joule heat by the internal short-circuiting in the nail penetration test enables to reduce the thickness of the first mixture layer, and more securely suppress an exothermic action of the positive electrode by the internal short-circuiting.

Another aspect of the invention is directed to a positive electrode, for use in a lithium secondary battery, comprising a positive electrode current collector, and a positive electrode film carried on the positive electrode current collector, wherein the positive electrode film contains, as a positive electrode active material, two or more kinds of lithium-containing compounds having exothermic initiation temperatures different from each other, at least one kind of the two or more kinds of lithium-containing compounds has the exothermic initiation temperature of 300° C. or higher, and the content of the lithium-containing compound having the exothermic initiation temperature of 300° C. or higher is increased in a thickness direction of the positive electrode film from an outermost layer of the positive electrode film toward the positive electrode current collector.

In the above arrangement, containing the lithium-containing compound having the exothermic initiation temperature of 300° C. or higher with the largest content in the positive electrode film portion closest to the positive electrode current collector that generates high Joule heat by the internal short-circuiting in the nail penetration test enables to securely suppress an exothermic action of the positive electrode by the internal short-circuiting to thereby minimize thermal runaway of the positive electrode. Simultaneously, this enables to increase the content of the lithium containing compound other than the lithium-containing compound having the exothermic initiation temperature of 300° C. or higher, i.e. the lithium-containing compound having a low exothermic initiation temperature and yet a significantly large capacity density in the thickness direction of the positive electrode film toward the outermost layer of the positive electrode film, which makes the positive electrode capacity large, while suppressing an exothermic action of the positive electrode by the internal short-circuiting. Consequently, this provides a lithium secondary battery positive electrode capable of securely suppressing overheating of a battery in the nail penetration test and having a large capacity.

Preferably, a portion of the positive electrode film, closest to the positive electrode current collector, may contain the positive electrode active material essentially consisting of the lithium-containing compound having the exothermic initiation temperature of 300° C. or higher. Containing solely the lithium-containing compound having the exothermic initiation temperature of 300° C. or higher in the positive electrode film portion closest to the positive electrode current collector that generates high Joule heat by the internal short-circuiting in the nail penetration test enables to securely suppress an exothermic action of the positive electrode by the internal short-circuiting, and to secure a large capacity.

Yet another aspect of the invention is directed to a lithium secondary battery comprising the aforementioned positive electrode, a negative electrode, and a non-aqueous electrolyte. Use of the inventive positive electrode allows for providing a large-capacity lithium secondary battery with enhanced reliability in the nail penetration test.

The inventive lithium secondary battery positive electrode is capable of securely suppressing overheating of the lithium secondary battery in the nail penetration test. Therefore, use of the inventive positive electrode allows for production of a large-capacity lithium secondary battery with enhanced reliability in the nail penetration test. The inventive lithium secondary battery is applicable to portable information terminals, portable electronic devices, home-use compact power storage devices, automatic bicycles, electric vehicles, hybrid electric vehicles, and the like.

This application is based on Japanese Patent Application No. 2005-205266 filed on Jul. 14, 2005, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A positive electrode, for use in a lithium secondary battery, comprising a positive electrode current collector, and a positive electrode film which is carried on the positive electrode current collector and includes a plurality of mixture layers, wherein the positive electrode film contains, as a positive electrode active material, two or more kinds of lithium-containing compounds having exothermic initiation temperatures different from each other, at least one kind of the two or more kinds of lithium-containing compounds has the exothermic initiation temperature of 300° C. or higher, a first mixture layer of the plural mixture layers, closest to the positive electrode current collector, contains at least one kind of the lithium-containing compound having the exothermic initiation temperature of 300° C. or higher, and said one kind of lithium-containing compound having the exothermic initiation temperature of 300° C. or higher contained in the first mixture layer is a lithium nickel manganese cobalt oxide represented by the chemical formula $Li_a Ni_{1-(b+c)} Mn_b Co_c O_2$ where a, b, and c satisfy $1 \leq a \leq 1.2$, $0.1 \leq b \leq 0.5$, and $0.1 \leq c \leq 0.5$, in the first mixture layer, the lithium-containing compound having the exothermic initiation temperature of 300° C. or higher and the lithium-containing compound other than the lithium-containing compound having the exothermic initiation temperature of 300° C. or higher are contained, and a content of the lithium-containing compound having the exothermic initiation temperature of 300° C. or higher is larger than a content of the lithium-containing compound other than the lithium-containing compound having the exothermic initiation temperature of 300° C. or higher, and in an outer mixture layer, the lithium-containing compound having the exothermic initiation temperature of 300° C. or higher and the lithium-containing compound other than the lithium-containing compound having the exothermic initiation temperature of 300° C. or higher are contained, and a content of the lithium-containing compound other than the lithium-containing compound having the exothermic initiation temperature of 300° C. or higher is larger than a content of the lithium-containing compound having the exothermic initiation temperature of 300° C. or higher.

2. The positive electrode according to claim 1, wherein, the positive electrode active material in the first mixture layer essentially consists of the lithium-containing compound having the exothermic initiation temperature of 300° C. or higher.

3. The positive electrode according to claim 1, wherein the first mixture layer further conatins the lithium-containing compound having the exothermic initiation temperature of 300° C. or higher which is at least one kind selected from the group consisting of lithium-manganese-based oxides, and olivine-type lithium-phosphate-based compounds.

4. The positive electrode according to claim 3, wherein the lithium-manganese-based oxides include a lithium manganese oxide represented by $LiMn_2O_4$.

5. The positive electrode according to claim 3, wherein the olivine-type lithium-phosphate-based compounds include an olivine-type lithium phosphate compound represented by $LiMePO_4$ where Me is at least one element selected from the group consisting of Co, Ni, Fe, and Mn.

6. The positive electrode according to claim 1, wherein the lithium-containing compound other than the lithium-containing compound having the exothermic initiation temperature of 300° C. or higher is at least one kind selected from the group consisting of lithium-cobalt-based oxides and lithium-nickel-based oxides.

7. The positive electrode according to claim 6, wherein the lithium-cobalt-based oxides include a lithium-cobalt-based oxide represented by $LiCoO_2$ or $Li_aCo_{1-(b+c)}Mg_bM_cO_2$ where a, b, and c satisfy $1 \leq a \leq 1.05$, $0.005 \leq b \leq 0.10$, and $0.005 \leq c \leq 0.10$, and M is at least one element selected from the group consisting of Al, Sr, and Ca.

8. The positive electrode according to claim 6, wherein the lithium-nickel-based oxides include a lithium-nickel-based oxide represented by $Li_aNi_{1-(b+c)}Co_bM_cO_2$ where a, b, and c satisfy $1 \leq a \leq 1.05$, $0.1 \leq b \leq 0.35$, and $0.005 \leq c \leq 0.30$, and M is at least one element selected from the group consisting of Al, Sr, and Ca.

9. A lithium secondary battery comprising the positive electrode according to claim 1, a negative electrode, and a non-aqueous electrolyte 10. A positive electrode, for use in a lithium secondary battery, comprising a positive electrode current collector, and a positive electrode film carried on the positive electrode current collector, wherein
the positive electrode film contains, as a positive electrode active material, two or more kinds of lithium-containing compounds having exothermic initiation temperatures different from each other,
at least one kind of the two or more kinds of lithium-containing compounds has the exothermic initiation temperature of 300° C. or higher,
a content of the lithium-containing compound having the exothermic initiation temperature of 300° C. or higher is increased in a thickness direction of the positive electrode film from an outermost layer of the positive electrode film toward the positive electrode current collector, and
said lithium-containing compound having the exothermic initiation temperature of 300° C. or higher is a lithium nickel manganese cobalt oxide represented by the chemical formula $Li_a Ni_{1-(b+c)}Mn_bCo_cO_2$ where a, b, and c satisfy $1 \leq a \leq 1.2$, $0.1 \leq b \leq 0.5$, and $0 1 \leq c \leq 0.5$ in a portion of the positive electrode film, closest to the positive electrode current collector, the lithium-containing compound having the exothermic initiation temperature of 300° C. or higher and the lithium-containing compound other than the lithium-containing compound having the exothermic initiation temperature of 300° C. or higher are contained, and a content of the lithium-containing compound having the exothermic initiation temperature of 300° C. or higher is larger than a content of the lithium-containing compound other than the lithium-containing compound having the exothermic initiation temperature of 300° C. or higher, and
in an outer mixture layer, the lithium-containing compound having the exothermic initiation temperature of 300° C. or higher and the lithium-containing compound other than the lithium-containing compound having the exothermic initiation temperature of 300° C. or higher are contained, and a content of the lithium-containing compound other than the lithium-containing compound having the exothermic initiation temperature of 300° C. or higher is larger than a content of the lithium-containing compound having the exothermic initiation temperature of 300° C. or higher.

11. The positive electrode according to claim 10, wherein the portion of the positive electrode film, closest to the positive electrode current collector, contains the positive electrode active material essentially consisting of the lithium-containing compound having the exothermic initiation temperature of 300° C. or higher.

12. The positive electrode according to claim 10, wherein the positive electrode film further contains the lithium-containing compound having the exothermic initiation temperature of 300° C. or higher which is at least one kind selected from the group consisting of lithium-manganese-based oxides, and olivine-type lithium-phosphate-based compounds.

13. The positive electrode according to claim 12, wherein the lithium-manganese-based oxides include a lithium manganese oxide represented by $LiMn_2O_4$.

14. The positive electrode according to claim 12, wherein the olivine-type lithium-phosphate-based compounds include an olivine-type lithium phosphate compound represented by $LiMePO_4$ where Me is at least one element selected from the group consisting of Co, Ni, Fe, and Mn.

15. The positive electrode according to claim 10, wherein the lithium-containing compound other than the lithium-containing compound having the exothermic initiation temperature of 300° C. or higher is at least one kind selected from the group consisting of lithium-cobalt-based oxides and lithium-nickel-based oxides.

16. The positive electrode according to claim 15, wherein the lithium-cobalt-based oxides include a lithium-cobalt-based oxide represented by $LiCoO_2$ or $Li_a Co_{1-(b+c)}Mg_b M_cO_2$ where a, b, and c satisfy $1 \leq a \leq 1.05$, $0.005 \leq \leq 0.10$, and $0.005 \leq c \leq 0.10$, and M is at least one element selected from the group consisting of Al, Sr, and Ca.

17. The positive electrode according to claim 15, wherein the lithium-nickel-based oxides include a lithium-nickel-based oxide represented by $Li_a Ni_{1-(b+c)}Co_bM_cO_2$ where a, b, and c satisfy $1 \leq a \leq 1.05$, $0.1 \leq b \leq 0.35$, and $0.005 \leq c \leq 0.30$, and M is at least one element selected from the group consisting of Al, Sr, and Ca.

18. A lithium secondary battery comprising the positive electrode according to claim 10, a negative electrode, and a non-aqueous electrolyte.

* * * * *